United States Patent
Meßmer et al.

(10) Patent No.: US 10,332,293 B2
(45) Date of Patent: Jun. 25, 2019

(54) AUGMENTING REALITY WITH REACTIVE PROGRAMMING

(71) Applicant: Facebook, Inc., Menlo Park, CA (US)

(72) Inventors: Sebastien Manuel Meßmer, London (GB); Sergei Viktorovich Anpilov, London (GB); Nikolai Grigorev, London (GB); Danil Gontovnik, London (GB); Yu Hang Ng, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/619,350

(22) Filed: Jun. 9, 2017

(65) Prior Publication Data
US 2018/0357802 A1   Dec. 13, 2018

(51) Int. Cl.
*G09G 5/377* (2006.01)
*G06K 9/00* (2006.01)
*G06T 7/70* (2017.01)
*G06T 11/60* (2006.01)

(52) U.S. Cl.
CPC .......... *G06T 11/60* (2013.01); *G06K 9/00221* (2013.01); *G06K 9/00624* (2013.01); *G06T 7/70* (2017.01); *G09G 5/377* (2013.01); *G06T 2207/10016* (2013.01); *G06T 2207/20221* (2013.01); *G06T 2207/30201* (2013.01); *G09G 2340/125* (2013.01)

(58) Field of Classification Search
CPC . G06T 11/60; G06T 7/70; G06T 2207/10016; G06T 2207/20221; G06T 2207/30201; G06T 19/20; G06K 9/00221; G06K 9/00624; G06K 9/00228; G06K 9/00335; G09G 2340/125; G09G 5/377
USPC .................................................. 345/629–634
See application file for complete search history.

(56) References Cited

U.S. PATENT DOCUMENTS

| | | | |
|---|---|---|---|
| 7,227,976 B1 * | 6/2007 | Jung ................... | G06K 9/00228 345/419 |
| 8,099,462 B2 * | 1/2012 | Sheng ................... | G06F 3/0481 345/629 |
| 9,058,765 B1 * | 6/2015 | Mallick ................. | G06F 3/0482 |
| 2013/0111337 A1 * | 5/2013 | Deng ................. | G06K 9/00248 715/255 |
| 2013/0303285 A1 * | 11/2013 | Kochi ................... | G06T 19/006 463/32 |
| 2015/0279117 A1 * | 10/2015 | Schimke ................. | G06F 21/32 345/633 |

(Continued)

*Primary Examiner* — Chante E Harrison
(74) *Attorney, Agent, or Firm* — Baker Botts L.L.P.

(57) ABSTRACT

In one or more embodiments, one or more systems, methods, and/or processes may utilize a reactive processing system in an augmented reality (AR) system. The AR system may execute program instructions based on a region of an input video signal and produce an output video signal that includes a first output that includes a video effect from the program instructions. The AR system may determine if the region of the input video signal changes. If so, the program instructions may be executed based on the region of the input video signal and a change of the region of the input video and produce the output video signal that includes the second output that includes the video effect. If not, the output video signal that includes the first output that includes the video effect may continue to be produced.

17 Claims, 14 Drawing Sheets

(56) References Cited

U.S. PATENT DOCUMENTS

| | | | |
|---|---|---|---|
| 2016/0086381 A1* | 3/2016 | Jung | G06F 17/30256 345/633 |
| 2016/0098851 A1* | 4/2016 | Wu | G06T 11/60 345/634 |
| 2017/0236001 A1* | 8/2017 | McLean | G06K 9/00281 345/620 |
| 2017/0255478 A1* | 9/2017 | Chou | G06F 9/4446 |
| 2018/0137632 A1* | 5/2018 | Takada | G06T 7/262 |
| 2018/0268582 A1* | 9/2018 | Schneider | G06T 11/60 |

\* cited by examiner

AUGMENTING REALITY WITH REACTIVE PROGRAMMING

TECHNICAL FIELD

This disclosure generally relates to augmented reality systems.

BACKGROUND

Augmented reality (AR) can allow virtual objects to be placed in a video stream. For example, AR can augment and/or modify input video with computer-generated sound, video, and/or graphics. In one instance, an AR system can utilize face-tracking software that allows a user to appear to wear a mask that moves with the user's face and/or changes expressions. In another instance, a nod of the user's head can cause the mask to move up and down over the user's face. Consumer-facing offerings like this can drive popularity in AR systems.

Realistic integration of the computer-generated sound, video, or graphics into the input video can be one measure of an AR system. AR systems process various facets of input video, and continually processing the various facets of the input video, regardless of any change or constancy in the input video, can introduce latency into an output video from an AR system. The latency can slow or reduce the integration of the computer-generated sound, video, and/or graphics into the input video.

SUMMARY OF PARTICULAR EMBODIMENTS

In one or more embodiments, one or more systems, methods, and/or processes may utilize a reactive processing system in an augmented reality system. In one example, the reactive system may utilize one or more of a dependency graph and an expression template, among others. In another example, the reactive system may utilize an effects engine that augments one or more video streams with video effects. In one or more embodiments, one or more of facial recognition and object recognition, among others, may provide one or more data bindings (e.g., one or more positions on a person in a video stream, one or more paths along the person in the video stream, etc.) may be utilized in binding functions that produce video effects. For example, the functions that produce video effects may be developed by programmers and uploaded to the reactive system.

In one or more embodiments, data bindings may include time, various parts of a person, a path (e.g., a path along a face, a path along a body, a path along an inanimate object, etc.), and a gyroscope, among others. For example, an application programming interface (API) may permit a programmer to attach a function that produces a video effect to a data binding. For instance, a computer vision process and/or system may provide one or more data bindings to one or more of a face of a person and another portion of the person, among others.

In one or more embodiments, the reactive system may utilize a video input signal, the processed input signal with one or more functions provided by one or more programmers, and provide video output with video effects of the one or more functions provided by the one or more programmers. For example, from video frame to video frame, if the input signal does not change, a function may not be executed, and the output video may remain unchanged. For instance, the reactive system may determine if a portion of the video input signal, that corresponds to a data binding of a function, changes. If the portion of the video input signal that corresponds to the data binding of the function changes, the function may be executed, and one or more of a video effect corresponding to the function may change in an output video signal (e.g., output video stream) and a position of the video effect corresponding to the function may change in the output video signal. If the portion of the video input signal that corresponds to the data binding of the function does not change, a corresponding portion of the output video signal that includes the video effect may not change. In this fashion, less processing in an augmented reality system may be accomplished, according to one or more embodiments. For example, less processing in the augmented reality system may reduce or eliminate latency of the augmented reality system.

The embodiments disclosed herein are only examples, and the scope of this disclosure is not limited to them. One or more embodiments may include all, some, or none of the components, elements, features, functions, operations, or steps of the embodiments disclosed herein. One or more embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed includes not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
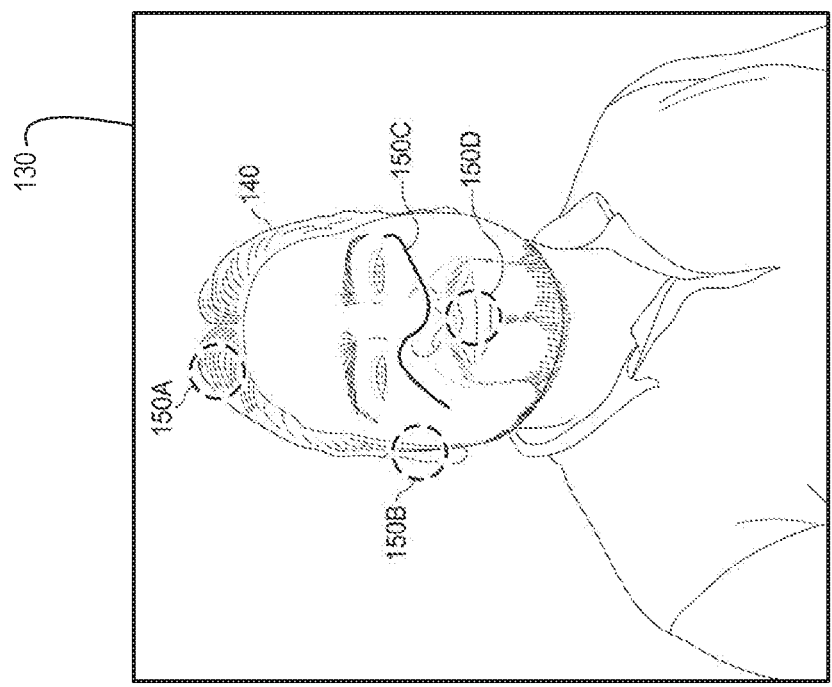
FIG. 1 illustrates an exemplary a video signal and data bindings, according to one or more embodiments.
Figure 1:
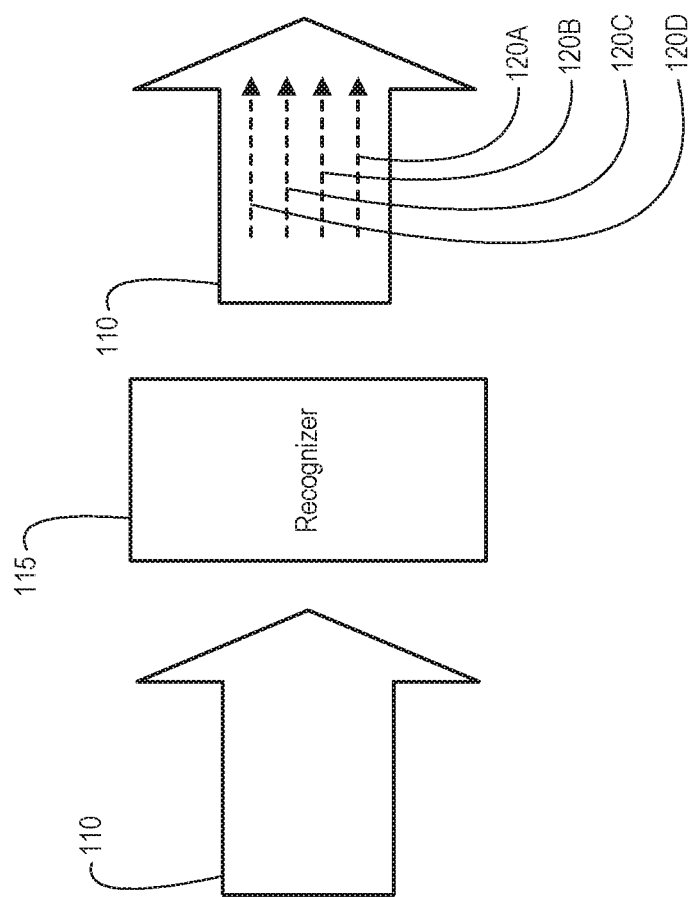

In one or more embodiments, an augmented reality system may allow virtual objects (e.g., video effects) to be placed in a video stream. For example, the augmented reality system may augment and/or modify input video with one or more sounds, videos, and/or graphics. In one or more embodiments, the augmented reality system may utilize a reactive processing system in augmenting and/or modifying the input video with the one or more sounds, videos, and/or graphics. In one example, the reactive system may utilize one or more of a dependency graph and/or an expression template, among others. In another example, the reactive system may utilize an effects engine that augments and/or modifies one or more video streams with video effects (e.g., sounds, videos, graphics, etc.). In one or more embodiments, user-provided functions, that produce video effects, may be provided to the augmented reality system and may be bound to data bindings (e.g., one or more feature points, one or more positions on a person in a video stream, one or more paths along the person in the video stream, etc.). For example, the functions that produce video effects may be developed by programmers and uploaded to the augmented reality system.

In one or more embodiments, an application programming interface (API) may permit a programmer (e.g., a software developer) to attach a function, that produces a video effect, to a data binding. For example, data bindings may include time, various parts of a person, a path (e.g., a path along a face, a path along a body, a path along an inanimate object, etc.), and a gyroscopic data binding, among others. For instance, a computer vision process and/or system may provide one or more data binding to a face of a person. In one or more embodiments, one or more systems, processes, and/or methods described herein may accomplish less processing in the augmented reality system. For example, less processing in the augmented reality system may reduce or eliminate latency of the augmented reality system.

In one or more embodiments, from video frame to video frame, if a video input signal does not change, a function that produces a video effect may not be executed, and an output video may remain unchanged. For example, the reactive system, of the augmented reality system, may determine if a video region of the video input signal, that corresponds to a data binding of a function, changes. In one instance, if the video region of the video input signal that corresponds to the data binding of the function changes, the function may be executed, and one or more of a video effect corresponding to the function may change in an output video signal (e.g., output video stream) and a position of the video effect corresponding to the function may change in the output video signal. In another instance, if the video region of the video input signal that corresponds to the data binding of the function does not change, a corresponding portion of the output video signal that includes the video effect may not change.

Turning now to FIG. 1, a video signal and data bindings are provided, according to one or more embodiments. As shown, a video signal 110 may be provided to a recognizer 115. In one or more embodiments, recognizer 115 may include one or more of a facial recognition process, method, and/or system, a computer vision process, method, and/or system, and an object recognition process, method, and/or system, among others. For example, recognizer 115 may receive video signal 110 and process video signal 110 to determine video regions 120A-120D of video signal 110. In one or more embodiments, one or more of video regions 120A-120D may include respective one or more video signal attributes. For example, a video attribute may include a transparency attribute, a color attribute, an intensity attribute, or a transparency attribute, among others.

As illustrated, streaming output 130 may display a person 140. For example, streaming output 130 may be streaming video output, and person 140 may be streaming video output of a person. In one or more embodiments, one or more data bindings may be associated with streaming output. As shown, data bindings 150A-150D may be associated with streaming output 130. For example, data bindings 150A-150D may be associated with person 140.

In one or more embodiments, one or more video regions may be associated with one or more respective data bindings. For example, video regions 120A-120D may be associated with respective data bindings 150A-150D. For instance, one or more video regions 120A-120D may change positions as respective one or more data bindings 150A-150D change positions from video frame to video frame.

In one or more embodiments, recognizer 115 may utilize one or more of data bindings 150A-150D in producing respective one or more video regions 120A-120D. In one example, recognizer 115 may receive video signal 110 and process video signal 110 based on data bindings 150A-150D to determine respective video regions 120A-120D of video signal 110. In one instance, one or more data bindings 150A-150D may change positions from video frame to video frame, recognizer 115 may process video signal 110 based on data bindings 150A-150D, and recognizer 115 may produce respective video regions 120A-120D that change positions from video frame to video frame. In another instance, one or more data bindings 150A-150D may change measurements from video frame to video frame, recognizer 115 may process video signal 110 based on data bindings 150A-150D, and recognizer 115 may produce respective video regions 120A-120D that change measurements from video frame to video frame. In another example, recognizer 115 may receive video signal 110 and process video signal 110 based on data bindings 150A-150D to determine if one or more data bindings 150A-150D changes position or changes measurement. In one instance, recognizer 115 may process video signal 110 and determine that data binding 150A changes position. In another instance, recognizer 115 may process video signal 110 and determine that data binding 150D changes measurement.

In one or more embodiments, streaming output may be augmented. For example, streaming output 130 may be augmented with one or more video effects. For instance, the one or more video effect may be associated with respective one or more data bindings. In one or more embodiments, streaming output 130 may be provided to a network. For example, streaming output 130 may be provided to one or more computer systems via the network.

Figure 2:
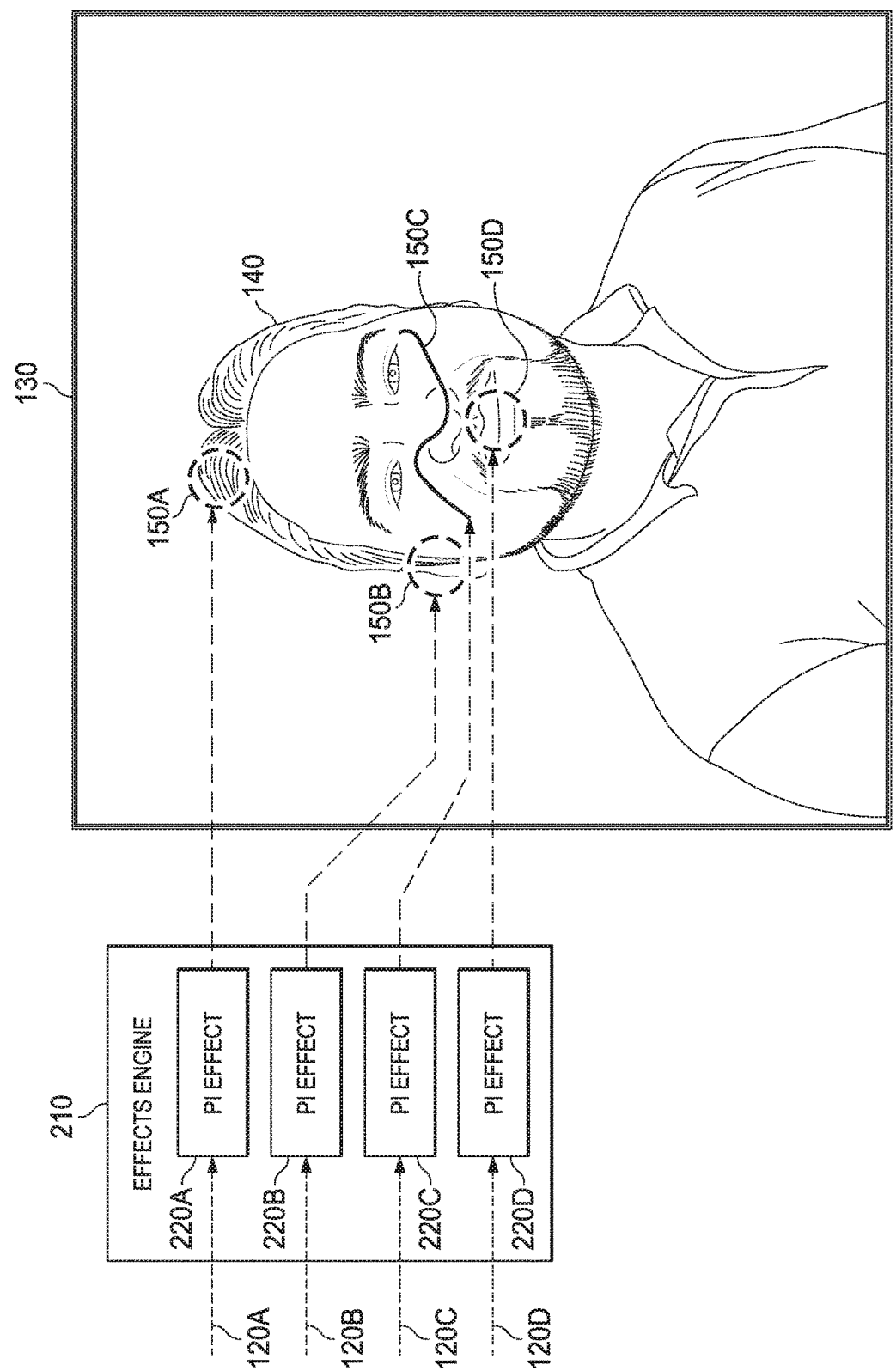
FIG. 2 illustrates exemplary programmable video effects of an effects engine, according to one or more embodiments.

Turning now to FIG. 2, a programmable video effects of an effects engine is illustrated, according to one or more embodiments. As shown, an effects engine 210 may utilized program instruction (PI) effects 220A-220D. In one or more embodiments, effects engine 210 may be or include a configurable reactive processing system. For example, effects engine 210 may be configured with PI effects 220A-220D. For instance, effects engine 210 may execute PI effects 220A-220D, and PI effects 220A-220D may receive respective video regions 120A-120D and produce output video effects associated with respective data bindings 150A-150D.

In one or more embodiments, an API may permit a programmer to attach a function that produces a video effect. For example, the function that utilizes the API may be compiled or interpreted to produce a PI effect of PI effects 220A-220D. In one instance, source program instructions (e.g., source code) may include the function, which may be compiled into processor instructions that are executable by a processor. In another instance, source program instructions (e.g., source code) may include the function, which the function may be compiled into processor instructions that are executable by a virtual machine (e.g., a Python virtual machine, a TLC virtual machine, a Lua virtual machine, a Squirrel virtual machine, a Java virtual machine, a VMWare virtual machine, a QEMU virtual machine, etc.).

In one or more embodiments, effects engine 210 may receive one or more of PI effects 220A-220D from a network. In one example, effects engine 210 may not store one or more of PI effects 220A-220D and executes the one or more of PI effects 220A-220D as the one or more of PI effects 220A-220D are streamed from the network. In another example, effects engine 210 may receive one or more of PI effects 220A-220D from the network and store the one or more of PI effects 220A-220D. In one or more embodiments, source program instructions may be received from a network. For example, source program instructions may be compiled to produce one or more of PI effects 220A-220D.

In one or more embodiments, effects engine 210 may include and/or may be implemented by a dependency graph and/or an expression template. In one example, if a video region of video regions 120A-120D does not change, then output from a corresponding PI effect of PI effects 220A-220D does not change. For instance, output from the corresponding PI effect may be maintained in streaming output 130. In another example, if a video region of video regions 120A-120D changes, then a corresponding PI effect of PI effects 220A-220D is executed, and output from the PI effect may augment streaming output 130. For instance, augmenting streaming output 130 with the output from the corresponding PI effect may include augmenting streaming output 130 with the output from the corresponding PI effect at or proximate to a data binding corresponding to the PI effect.

Figure 3:
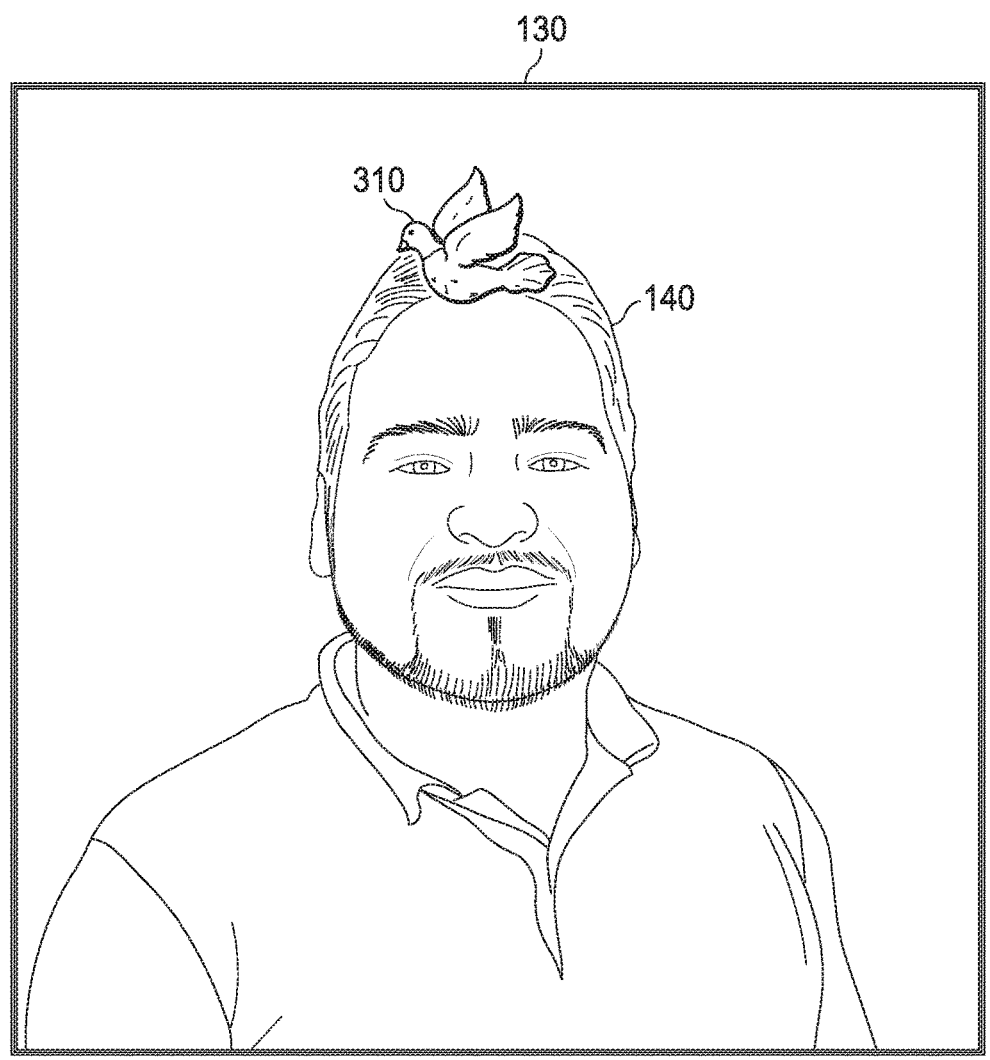
FIG. 3 illustrates an exemplary effect that utilizes a point data binding, according to one or more embodiments.

Turning now to FIG. 3, an effect that utilizes a point data binding is illustrated, according to one or more embodiments. As shown, a video effect 310 may utilize data binding 150A. In one or more embodiments, video effect 310 may be bound to point data binding 150A. For example, video effect 310 may appear to sit on a head of person 140 in streaming output 130.

Figure 4:
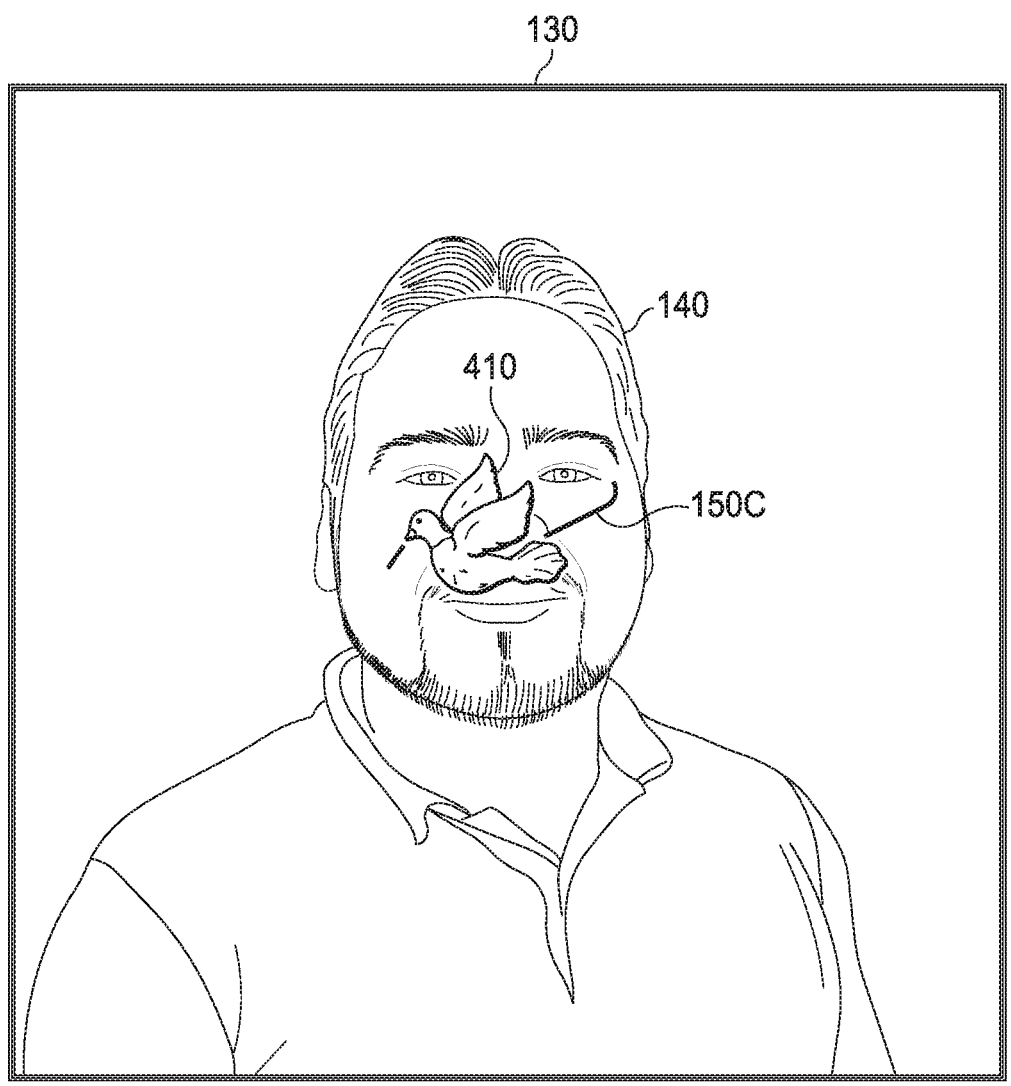
FIG. 4 illustrates an exemplary effect that utilizes a path data binding, according to one or more embodiments.

Turning now to FIG. 4, an effect that utilizes a path data binding is illustrated, according to one or more embodiments. As shown, a video effect 410 may utilize data binding 150C. In one or more embodiments, a "face checker" (e.g., a computer vision process) may be utilized with the API that may permit a programmer to attach a function that produces a video effect for an attribute of the face checker. For example, the attribute of the face checker may be data binding 150C. In one or more embodiments, effect 410 may travel along data binding 150C. For example, video effect 410 may appear to fly along path data binding 150C across a face of person 140 in streaming output 130. For instance, a position of video effect 410 along path data binding 150C may be updated and/or changed as an amount of time transpires.

Figure 5A:
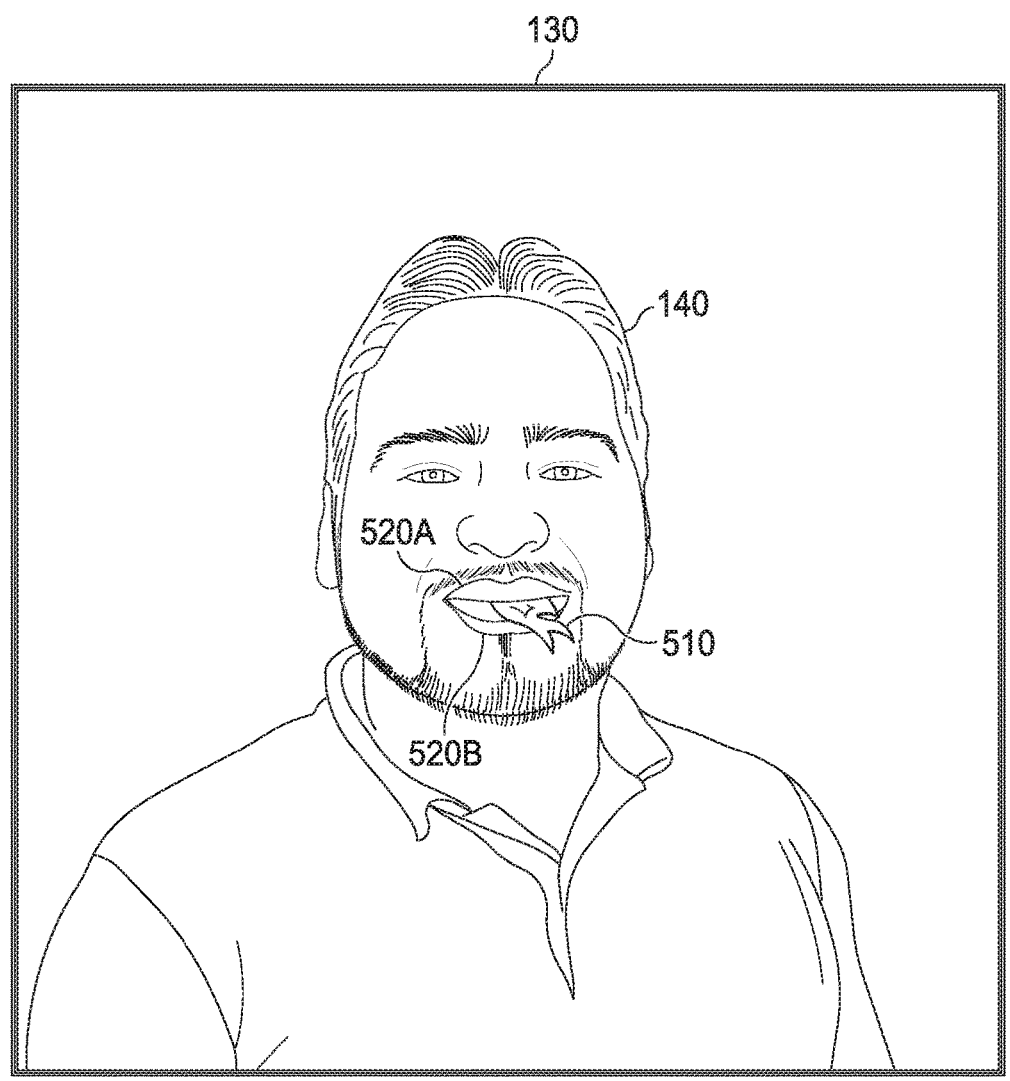
FIGS. 5A-5C illustrate an exemplary effect that varies with a data binding, according to one or more embodiments.
Figure 5B:
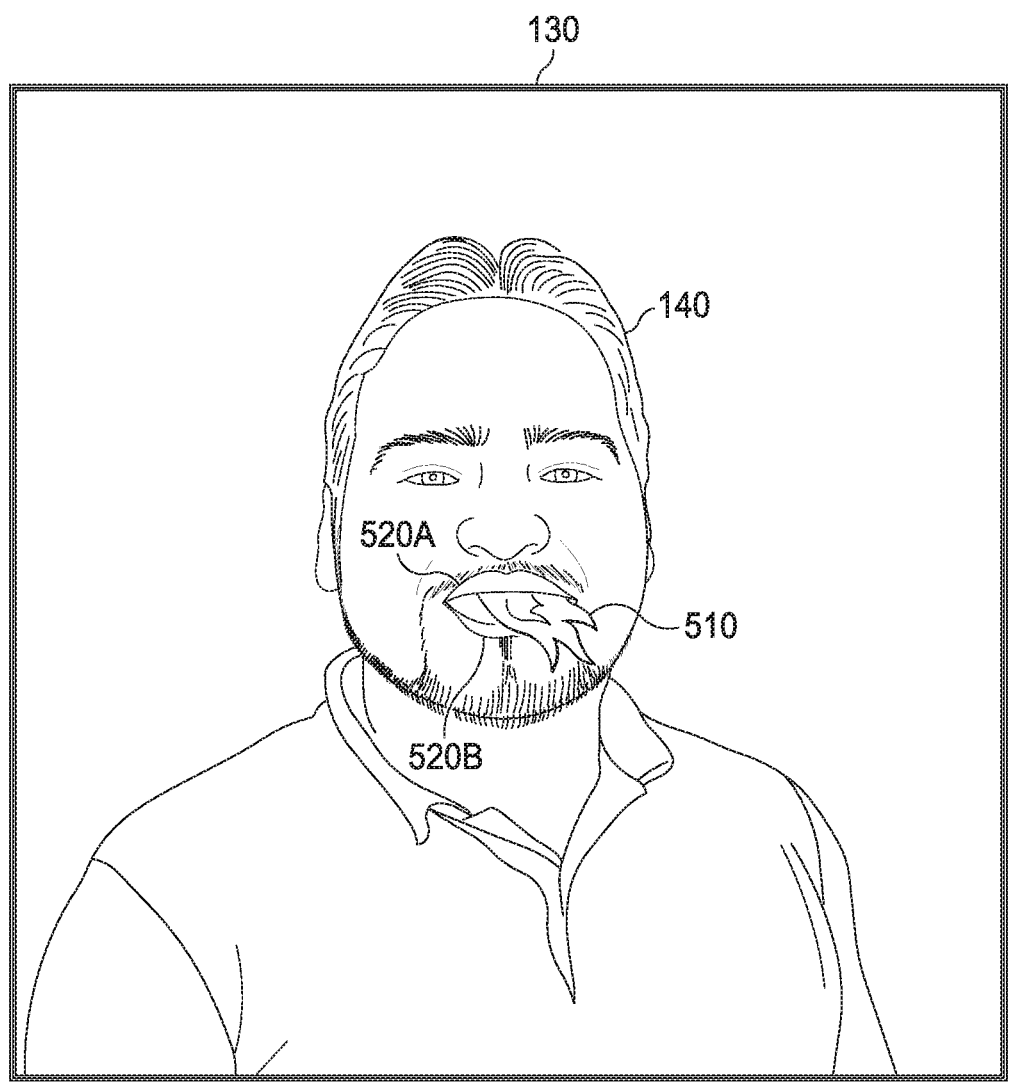
Figure 5C:
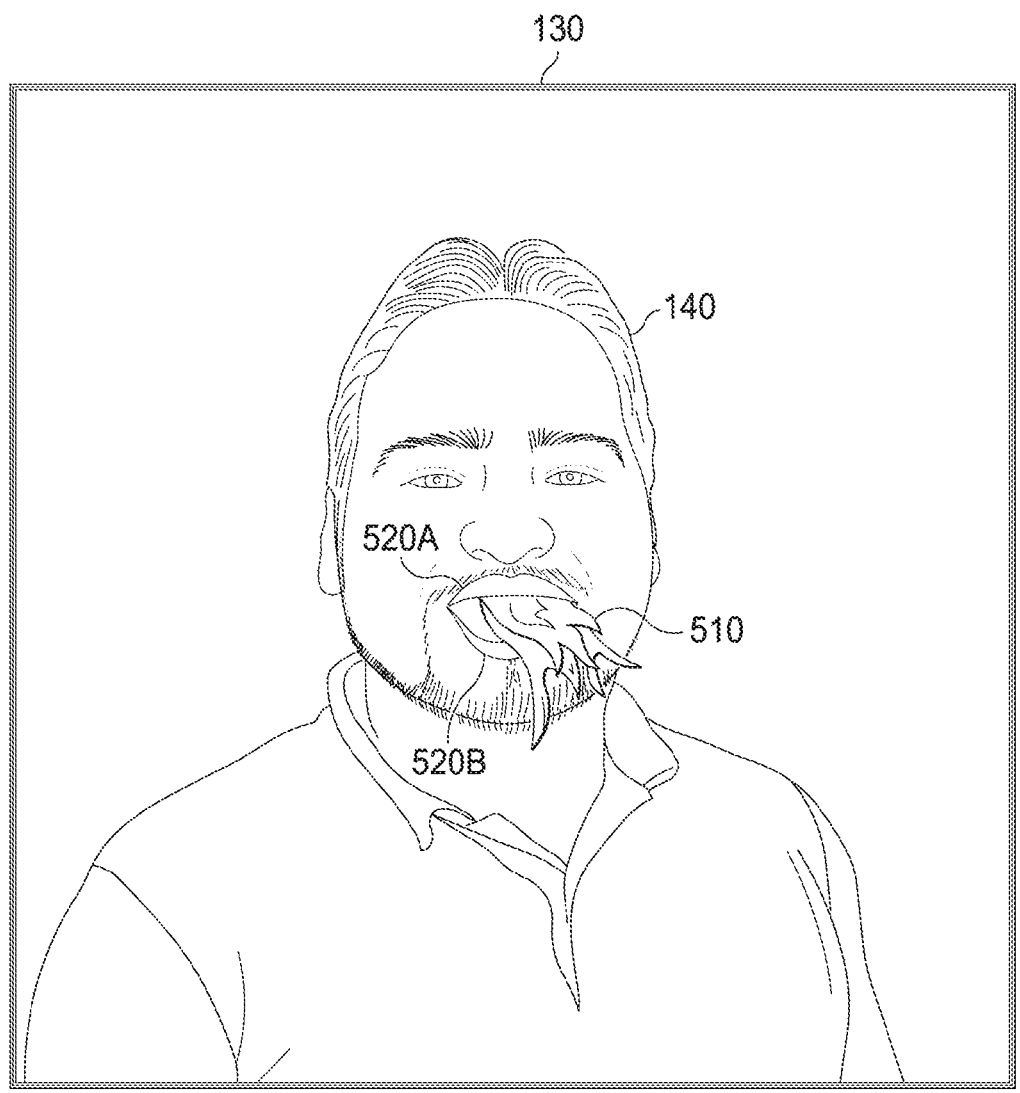

Turning now to FIGS. 5A-5C, an effect that varies with a data binding is illustrated, according to one or more embodiments. As shown in FIG. 5A, a video effect 510 may utilize data binding 150D. In one or more embodiments, a video effect may utilize one or more attributes associated with a data binding. For example, recognizer 115 may determine one or more attributes associated with data binding 150D. For instance, the one or more attributes may include one or more measurements. For instance, recognizer 115 may determine a distance between lips 520A and 520B.

In one or more embodiments, recognizer 115 may include, a computer vision process, such as the face checker, that may determine the one or more attributes associated with data binding 150D. In one example, the computer vision process may determine how much lips 520A and 520B are apart. In another example, a distance between lips 520A and 520B may be utilized in determining how much a mouth of person 140 is open. As illustrated in FIGS. 5A-5C, a video effect 510 may be changed in accordance with how much the mouth of person 140 is open. In one example, a flame (e.g., video effect 150D) may be bigger as more open the mouth of person 140 becomes. For instance, video effect 150D may augment fire breathing to person 140. In another example, the flame (e.g., video effect 150D) may be smaller as less open the mouth of person 140 becomes.

Figure 6A:
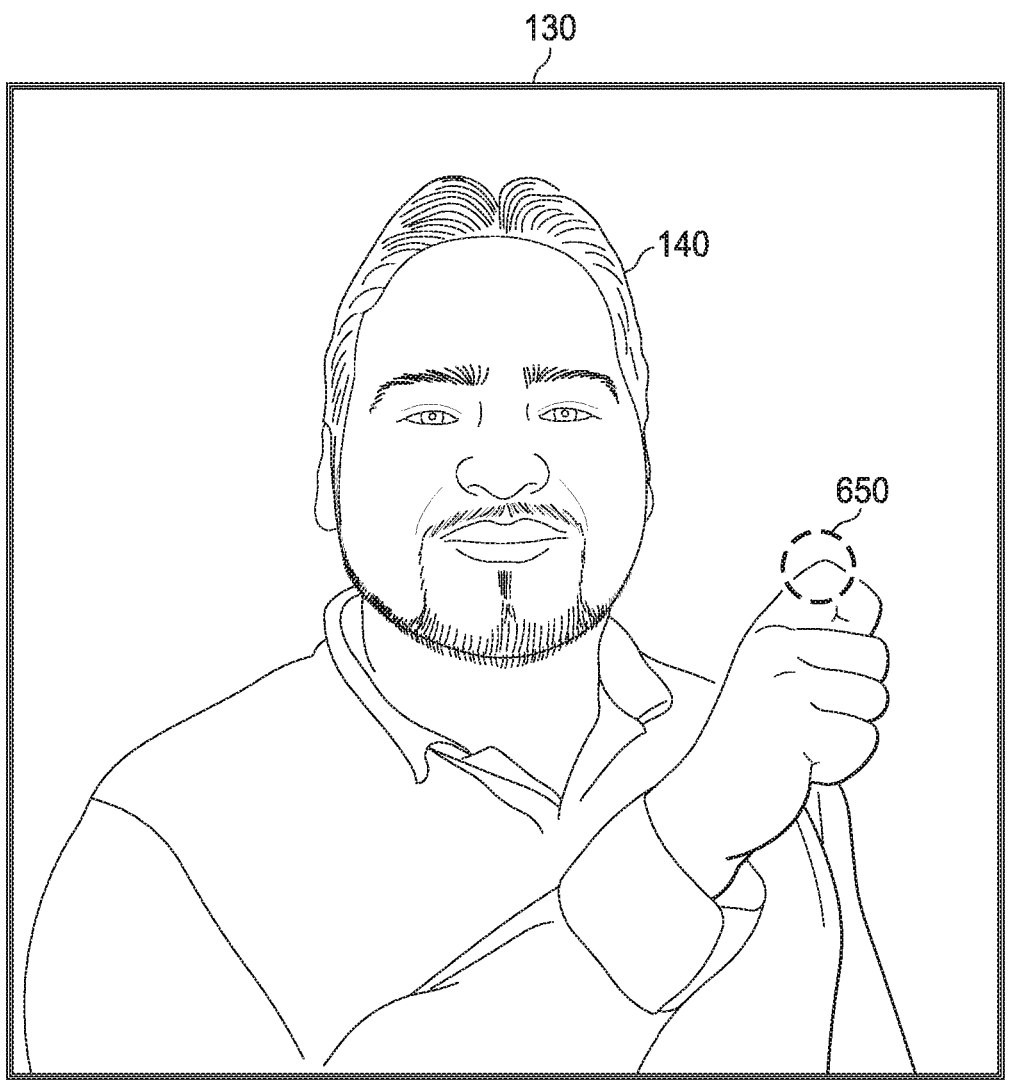
FIGS. 6A-6D illustrates an exemplary video effect that corresponds a data binding attached to a hand of a person, according to one or more embodiments.
Figure 6B:
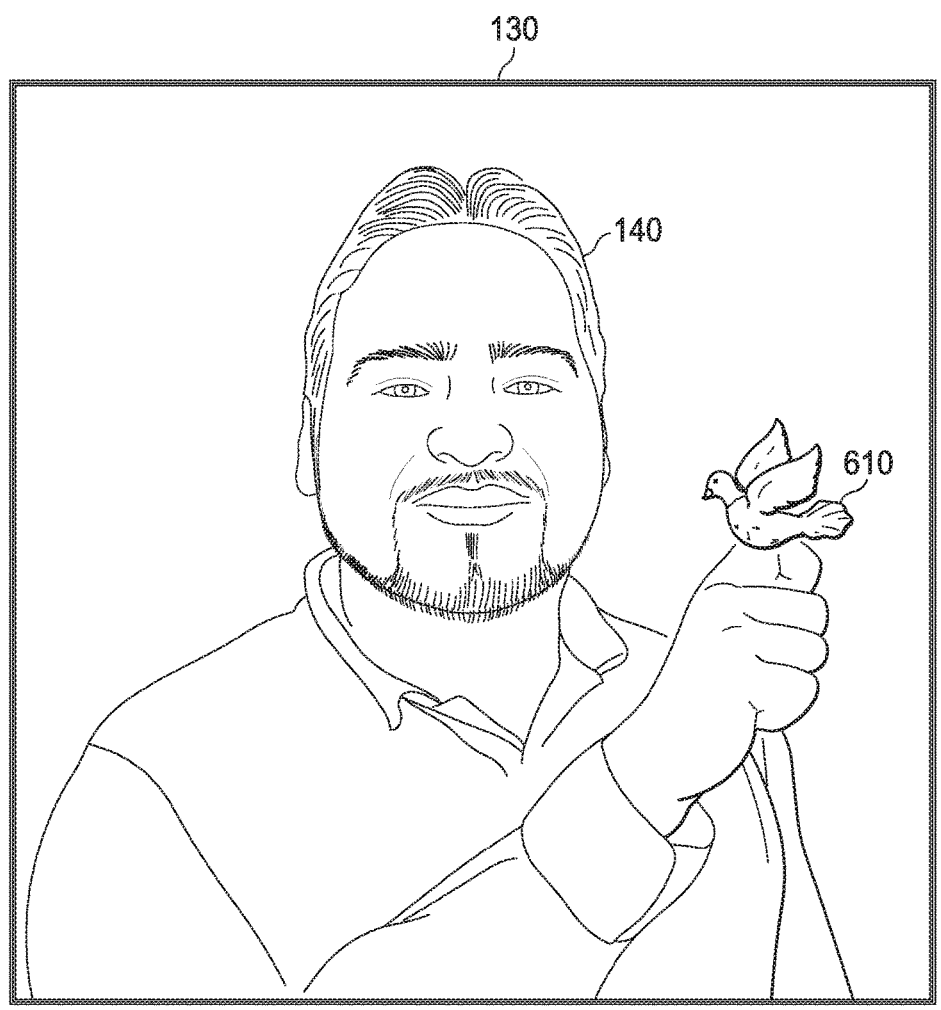
Figure 6C:
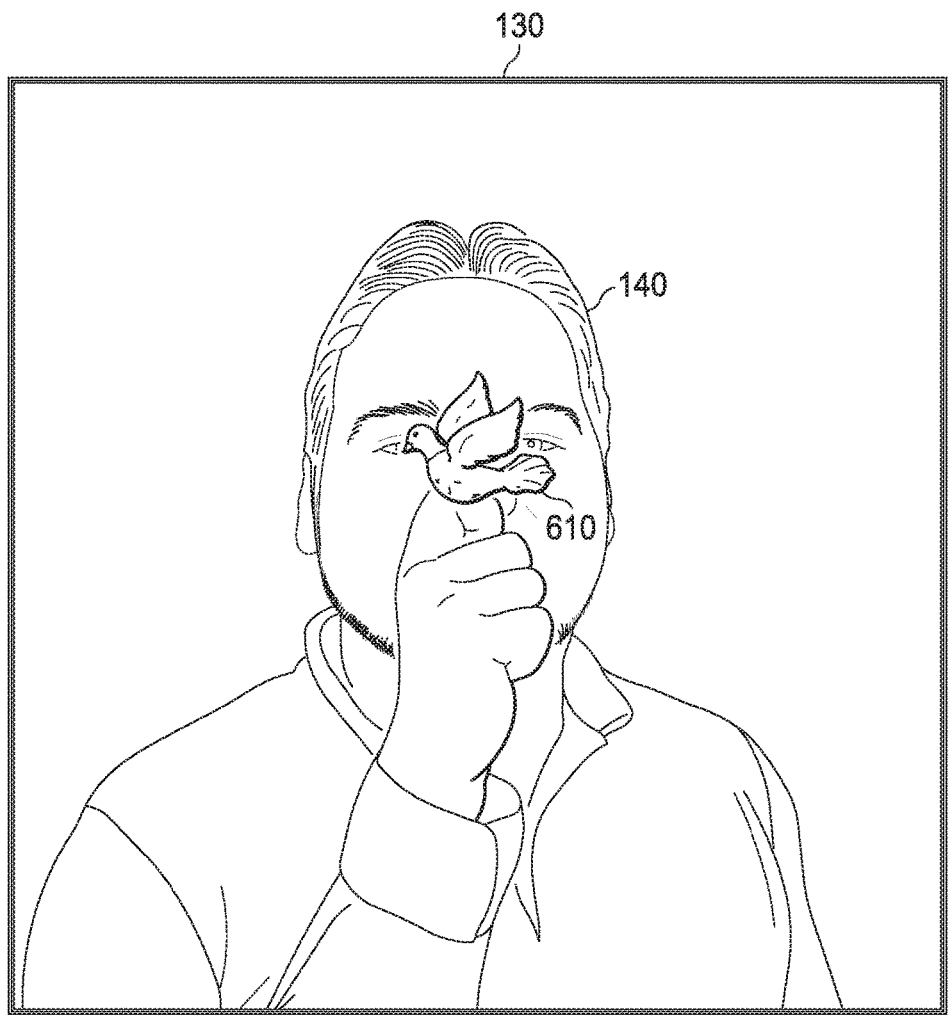
Figure 6D:
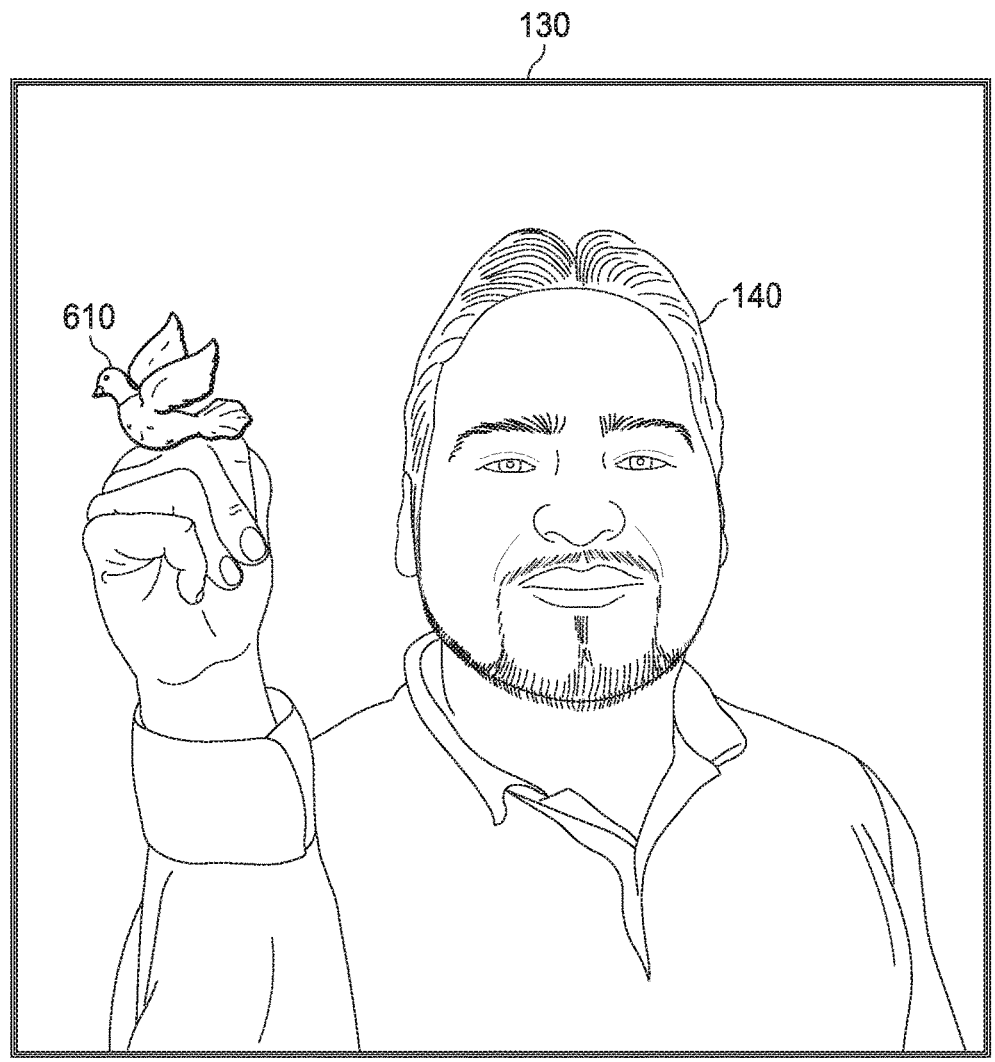

Turning now to FIGS. 6A-6D, a video effect that corresponds a data binding attached to a hand of a person is illustrated, according to one or more embodiments. As shown in FIG. 6A, a data binding 650 may be associated with a hand of person 140. As illustrated in FIGS. 6B-6D, a video effect 610 may utilize data binding 650. In one or more embodiments, video effect 610 may be bound to point data binding 650. In one example, video effect 610 may appear to sit on a hand of person 140 in streaming output 130. For instance, video effect 610 may appear to sit on the hand of person 140 in streaming output 130 while the hand is still or is moving. In another example, recognizer 115 may process video signal 110 and determine that data binding 650 changes position.

Figure 7:
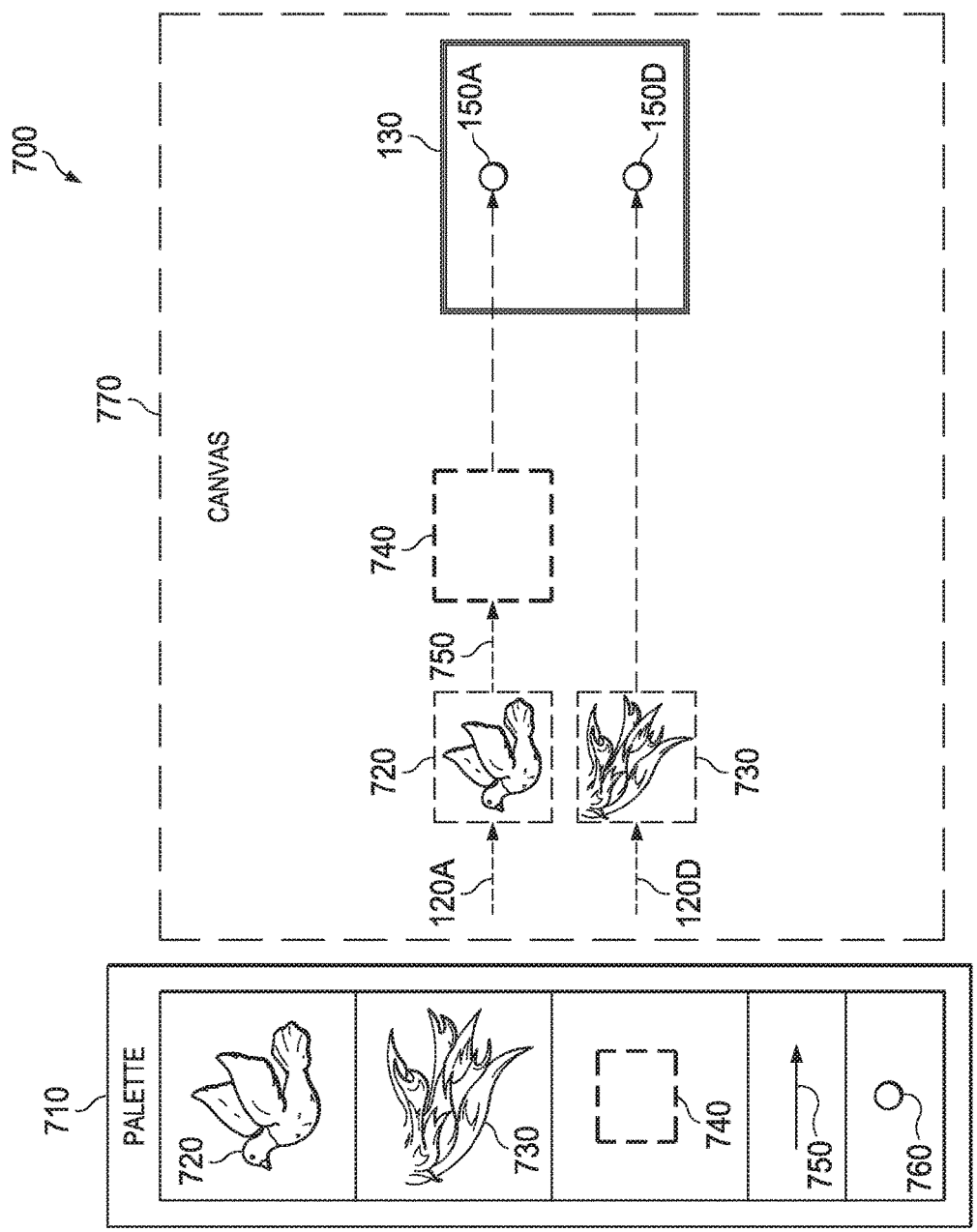
FIG. 7 illustrates an exemplary augmented video effects development environment, according to one or more embodiments.

Turning now to FIG. 7, an augmented video effects development environment is illustrated, according to one or more embodiments. As shown, an augmented video effects development environment 700 may include a palette 710 that may include video effects 720-740. In one or more embodiments, a user (e.g., a programmer, developer, etc.) may configure one or more PI effects from one or more video effects of palette 710 and/or one or more stream elements. For example, the stream elements may be utilized to couple two or more video effects in a data processing progression and/or sequence. In one or more embodiments, the user may utilize a data binding in augmenting streaming output 130 with a configured PI effect.

As illustrated, palette 710 may include stream element 750 and data binding 760. In one or more embodiments, a user (e.g., a programmer) may select and place (e.g., drag-and-drop) one or more video effects, one or more stream elements, and/or one or more data bindings in producing one or more PI effects. In one example, the user may select video effect 720 with video region 120A as an input. In a second example, the user may select stream element 750 for an output of video effect 720. For instance, stream element 750 may be dragged onto canvas 770 and configured with video region 120A or configured as video region 120A. In a third example, the user may select video effect 740 with video stream element 750 as an input. For instance, video effect 740 may include one or more attributes, such as transparency, colors, intensity, etc. In a fourth example, the user may select data binding 760, which may become data binding 150A that may be utilized in augmenting streaming output 130. In another example, the user may select video effect 730 with video region 120D as an input, and the user may select data binding 760, which may become data binding 150D that may be utilized in augmenting streaming output 130.

Figure 8:
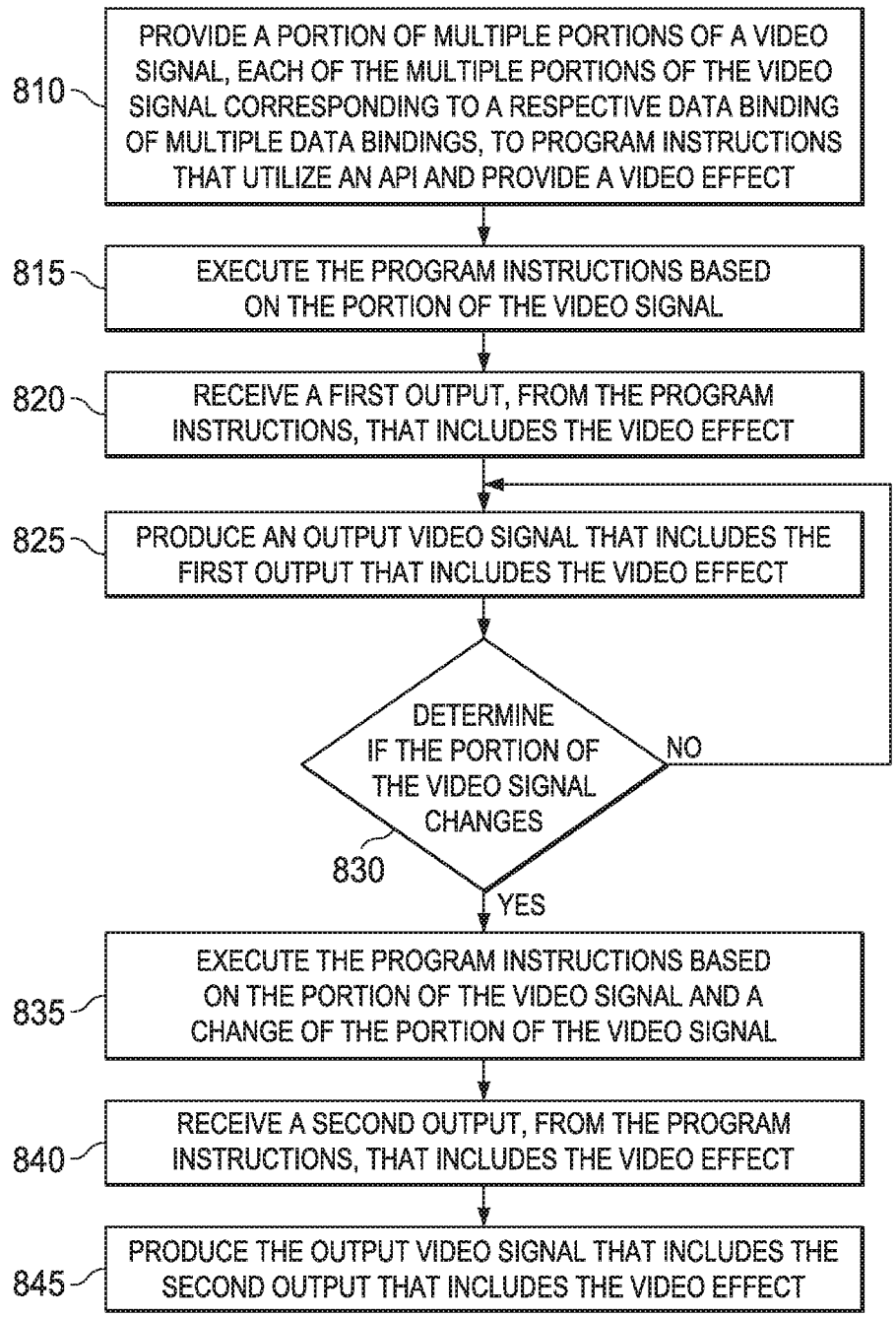
FIG. 8 illustrates an exemplary method of operating an augmented reality system, according to one or more embodiments.

Turning now to FIG. 8, a method of operating an augmented reality system is illustrated, according to one or more embodiments. At 810, a portion of multiple video regions of a video signal, each of the multiple video regions of the video signal corresponding to a respective data binding of multiple data bindings, may be provided to program instructions that utilize an API and provide a video effect. For example, a video region of video regions 120A-120D, corresponding to respective data bindings 150A-150D, may be provided to a respective PI effect of PI effects 220A-220D that provides a video effect.

At 815, the program instructions may be executed based on the portion of the video signal. For example, the respective PI effect of PI effects 220A-220D may be executed utilizing the video region of video regions 120A-120D as input. For instance, effects engine 210 may execute the respective PI effect of PI effects 220A-220D utilizing the video region of video regions 120A-120D as input.

At 820, a first output, from the program instructions, that includes the video effect may be received. For example, effects engine 210 may receive a first output, from the respective PI effect of PI effects 220A-220D, that includes the video effect. In one instance, effects engine 210 may receive a first output, from PI effect 220A, that includes video effect 310 (illustrated in FIG. 3). In a second instance, effects engine 210 may receive a first output, from PI effect 220C, that includes video effect 410 (illustrated in FIG. 4). In another instance, effects engine 210 may receive a first output, from PI effect 220D, that includes video effect 510 (illustrated in FIGS. 5A-5C).

At 825, an output video signal that includes the first output that includes the video effect may be produced. For example, effects engine 210 may produce an output video signal that includes the first output that includes the video effect. In one instance, effects engine 210 may produce streaming output 130 that includes video effect 310 (illustrated in FIG. 3). In a second instance, effects engine 210 may produce streaming output 130 that includes video effect 410 (illustrated in FIG. 4). In another instance, effects engine 210 may produce streaming output 130 that includes video effect 510 (illustrated in FIGS. 5A-5C). In one or more embodiments, producing the first output that includes the first output that includes the video effect may include combining the first output with at least one other output. In one example, producing the first output may include combining two or more of outputs associated with respective two or more video effects of video effect 310, video effect 410, and video effect 510, among others. In another example, producing the first output may include combining an output associated with a video effect of video effect 310, video effect 410, and video effect 510, among others, an other video that was not processed via one or more of effects engine 210 and a PI effect (e.g., a PI effect of PI effects 220A-220D).

At 830, it may be determined if the portion of the video signal changes. For example, effects engine 210 may determine if the video region of video regions 120A-120D changes. If the portion of the video signal does not change, the method may proceed to 825. If the portion of the video signal changes, the program instructions may be executed based on the portion of the video signal and a change of the portion of the video signal at 835. For example, the respective PI effect of PI effects 220A-220D may be executed utilizing the video region of video regions 120A-120D and a change of the video region of video regions 120A-120D. For instance, effects engine 210 may execute the respective PI effect of PI effects 220A-220D utilizing the video region of video regions 120A-120D and the change of the video region of video regions 120A-120D.

In one or more embodiments, determining if the portion of the video signal changes may include determining if at least one of a measure associated with the corresponding data binding changes and a position associated with the corresponding data binding changes, among others. In one example, a measure associated with data binding 150D may change. For instance, the measure may include how much lips 520A and 520B (illustrated in FIGS. 5A-5C) are apart. In a second example, a head of person 140 may rotate, and a position of data binding 150C (illustrated in FIG. 4) may change. For instance, the position of data binding 150C may change when the head of person 140 rotates. In another example, a hand of person 140 may change position, and a position of data binding 650 (illustrated in FIGS. 6A-6D) may change. For instance, the position of data binding 650 may change when the hand of person 140 changes position.

At 840, second output, from the program instructions, that includes the video effect may be received. For example, effects engine 210 may receive a second output, from the respective PI effect of PI effects 220A-220D, that includes the video effect. In one instance, effects engine 210 may receive a second output, from PI effect 220A, that includes video effect 310 (illustrated in FIG. 3). In a second instance, effects engine 210 may receive a second output, from PI effect 220C, that includes video effect 410 (illustrated in FIG. 4). In another instance, effects engine 210 may receive a second output, from PI effect 220D, that includes video effect 510 (illustrated in FIGS. 5A-5C). In one or more embodiments, receiving the second output from the program instructions that includes the video effect may include receiving the second output from the program instructions that includes the video effect adjusted in accordance with a change of at least one of a measure and a position, among others.

At 845, an output video signal that includes the second output that includes the video effect may be produced. For example, effects engine 210 may produce an output video signal that includes the second output that includes the video effect. In one instance, effects engine 210 may produce streaming output 130 that includes video effect 310 (illustrated in FIG. 3). In a second instance, effects engine 210 may produce streaming output 130 that includes video effect 410 (illustrated in FIG. 4). In another instance, effects engine 210 may produce streaming output 130 that includes video effect 510 (illustrated in FIGS. 5A-5C). In one or more embodiments, producing the output video signal that includes the second output that includes the video effect may include producing the output video signal that includes the second output that includes the video effect adjusted in accordance with a change of at least one of a measure and a position, among others.

Figure 9:
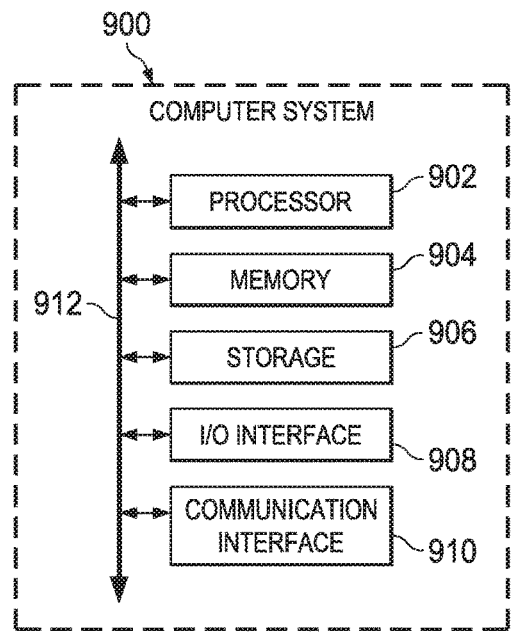
FIG. 9 illustrates an exemplary computer system, according to one or more embodiments.

Turning now to FIG. 9, an exemplary computer system is illustrated, according to one or more embodiments. In one or more embodiments, one or more computer systems 900 may perform one or more steps of one or more methods described and/or illustrated herein. In one or more embodiments, one or more computer systems 900 may provide functionality described and/or illustrated herein. In one or more embodiments, software running on one or more computer systems 900 may perform one or more steps of one or more methods described and/or illustrated herein and/or may provide functionality described and/or illustrated herein. In one or more embodiments, effects engine 210 may include one or more computer systems 900. Particular one or more embodiments may include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described and/or illustrated herein. As an example and not by way of limitation, one or more computer systems 900 may perform in real time or in batch mode one or more steps of one or more methods described and/or illustrated herein. One or more computer systems 900 may perform at different times and/or at different locations one or more steps of one or more methods described and/or illustrated herein, where appropriate.

In one or more embodiments, computer system 900 may include a processor 902, memory 904, storage 906, an input/output (I/O) interface 908, a communication interface 910, and a bus 912, among others. Although this disclosure describes and illustrates a particular computer system having a particular number of particular components in a particular arrangement, this disclosure contemplates any suitable computer system having any suitable number of any suitable components in any suitable arrangement.

In one or more embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, and/or storage 906. In one or more embodiments, processor 902 may include one or more internal caches for data, instructions, and/or addresses. This disclosure contemplates processor 902 including any suitable number of any suitable internal caches, where appropriate. As an example and not by way of limitation, processor 902 may include one or more instruction caches, one or more data caches, and/or one or more translation lookaside buffers (TLBs). Instructions in the instruction caches may be copies of instructions in memory 904 and/or storage 906, and the instruction caches may speed up retrieval of those instructions by processor 902. Data in the data caches may be copies of data in memory 904 and/or storage 906 for instructions executing at processor 902 to operate on; the results of previous instructions executed at processor 902 for access by subsequent instructions executing at processor 902 and/or for writing to memory 904 and/or storage 906; or other suitable data. The data caches may speed up read and/or write operations by processor 902. The TLBs may speed up virtual-address translation for processor 902. In one or more embodiments, processor 902 may include one or more internal registers for data, instructions, and/or addresses. This disclosure contemplates processor 902 including any suitable number of any suitable internal registers, where appropriate. Where appropriate, processor 902 may include one or more arithmetic logic units (ALUs); be a multi-core processor; and/or include one or more processors 902. Although this disclosure describes and illustrates a particular processor, this disclosure contemplates any suitable processor.

In one or more embodiments, memory 904 includes main memory for storing instructions for processor 902 to execute and/or data for processor 902 to operate on. For instance, memory 904 may store instructions, for processor 902 to execute, that implement one or more steps of one or more methods described and/or illustrated herein. As an example and not by way of limitation, computer system 900 may load instructions from storage 906 and/or another source (such as, for example, another computer system 900) to memory 904. Processor 902 may then load the instructions from memory 904 to an internal register and/or internal cache. To execute the instructions, processor 902 may retrieve the instructions from the internal register and/or internal cache and decode them. During and/or after execution of the instructions, processor 902 may write one or more results (which may be intermediate and/or final results) to the internal register and/or internal cache. Processor 902 may then write one or more of those results to memory 904. In one or more embodiments, processor 902 executes only instructions in one or more internal registers and/or internal caches and/or in memory 904 (as opposed to storage 906 or elsewhere) and operates only on data in one or more internal registers and/or internal caches and/or in memory 904 (as opposed to storage 906 or elsewhere). One or more memory buses (which may each include an address bus and a data bus) may couple processor 902 to memory 904. Bus 912 may include one or more memory buses, as described below. In one or more embodiments, one or more memory management units (MMUs) reside between processor 902 and memory 904 and facilitate accesses to memory 904 requested by processor 902. In one or more embodiments, memory 904 may include random access memory (RAM). This RAM may include volatile memory, where appropriate. Where appropriate, this RAM may include dynamic RAM (DRAM) and/or static RAM (SRAM). Moreover, where appropriate, this RAM may include single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In one or more embodiments, storage 906 includes mass storage for data and/or instructions. For instance, storage 906 may store instructions, for processor 902 to execute, that implement one or more steps of one or more methods described and/or illustrated herein. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In one or more embodiments, storage 906 may include non-volatile, solid-state memory. For example, storage may include a solid state drive (SSD). In one or more embodiments, storage 906 includes read-only memory (ROM). Where appropriate, this ROM may include mask-programmed ROM, programmable ROM (PROM), erasable PROM (EPROM), electrically erasable PROM (EEPROM), Ferroelectric RAM (FRAM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In one or more embodiments, I/O interface 908 may include one or more of hardware, firmware, and software that may provide one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. In one or more embodiments, an I/O device may include one or more sensors. This disclosure contemplates any suitable I/O devices and/or any suitable I/O interfaces 908 for them. Where appropriate, I/O interface 908 may include one or more device and/or software drivers that may enable processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In one or more embodiments, communication interface 910 may include one or more of hardware, firmware, and software that may provide one or more interfaces for communication (such as, for example, packet-based communication) between computer system 900 and one or more other computer systems 900 and/or one or more networks. As an example and not by way of limitation, communication interface 910 may include a network interface controller (NIC) and/or network adapter for communicating with an Ethernet or other wire-based network and/or a wireless NIC (WNIC) and/or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a satellite communications network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In one or more embodiments, bus 912 may include one or more of hardware, firmware, and software coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a serial advanced technology attachment (SATA) bus, a Video Electronics Standards Association local (VLB) bus, or another suitable bus or a combination of two or more of these. As an example and not by way of limitation, bus 912 may include one or more PCI-Express (PCIe) root complexes and/or one or more PCIe switches. Bus 912 may include one or more buses 912, where appropriate. Although this disclosure describes and illustrates a particular bus, this disclosure contemplates any suitable bus and/or interconnect.

Figure 10:
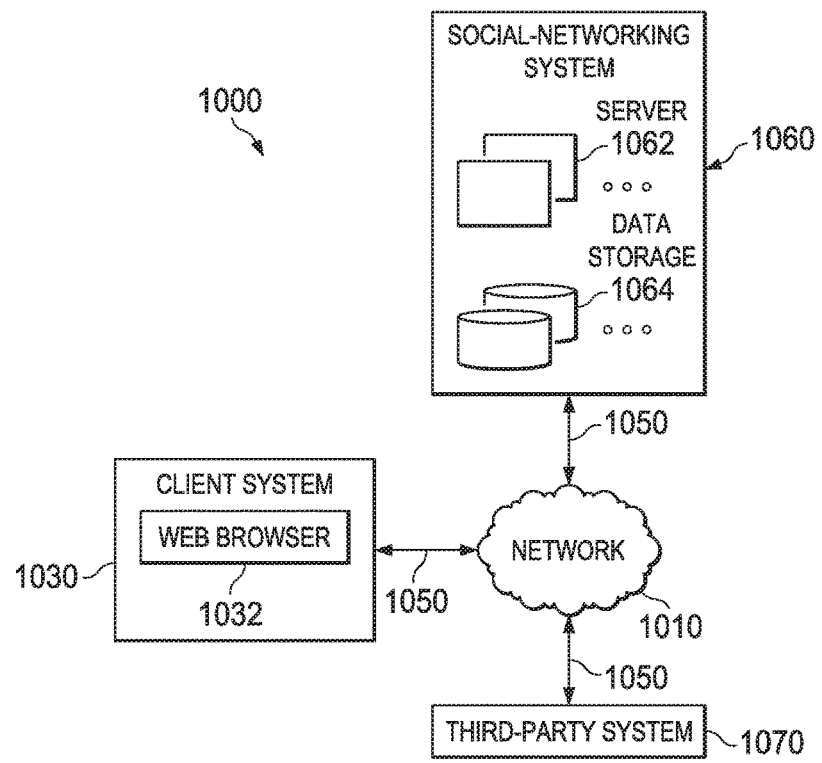
FIG. 10 illustrates an exemplary network environment associated with a social-networking system, according to one or more embodiments.

Turning now to FIG. 10, an exemplary network environment associated with a social-networking system is illustrated, according to one or more embodiments. As shown, a network environment 1000 may a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In one or more embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), and/or optical (such as for example Synchronous Optical Network (SONET) or Synchronous Digital Hierarchy (SDH)) links. In one or more embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In one or more embodiments, client system 1030 may be an electronic device including hardware, software, firmware, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In one or more embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, and/or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In one or more embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser 1032, or a native application associated with social-networking system 1060 (e.g., a mobile social-networking application, a messaging application, another suitable application, or any combination thereof) either directly or via network 1010. In one or more embodiments, social-networking system 1060 may include one or more servers 1062. Each server 1062 may be a unitary server or a distributed server spanning multiple computers and/or multiple datacenters. Servers 1062 may be of various types, such as, for example and without limitation, web server, news server, mail server, message server, advertising server, file server, application server, exchange server, database server, proxy server, another server suitable for performing functions and/or processes described herein, or any combination thereof. In one or more embodiments, each server 1062 may include hardware, software, firmware, or embedded logic components or a combination of two or more such components for carrying out the appropriate functionalities implemented and/or supported by server 1062. In one or more embodiments, social-networking system 1060 may include one or more data stores 1064. Data stores 1064 may be used to store various types of information. In one or more embodiments, the information stored in data stores 1064 may be organized according to specific data structures. In one or more embodiments, each data store 1064 may be a relational, columnar, correlation, and/or other suitable database. Although this disclosure describes and/or illustrates particular types of databases, this disclosure contemplates any suitable types of databases. One or more particular embodiments may provide interfaces that enable a client system 1030, a social-networking system 1060, or a third-party system 1070 to manage, retrieve, modify, add, and/or delete, the information stored in data store 1064.

In one or more embodiments, social-networking system 1060 may store one or more social graphs in one or more data stores 1064. In one or more embodiments, a social graph may include multiple nodes—which may include multiple user nodes (each corresponding to a particular user) and/or multiple concept nodes (each corresponding to a particular concept)—and multiple edges connecting the nodes. Social-networking system 1060 may provide users of the online social network the ability to communicate and interact with other users. In one or more embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, and/or relationship via social-networking system 1060.

In one or more embodiments, social-networking system 1060 may provide users with the ability to take actions on various types of items and/or objects, supported by social-networking system 1060. As an example and not by way of limitation, the items and objects may include groups and/or social networks to which users of social-networking system 1060 may belong, events and/or calendar entries in which a user might be interested, computer-based applications that a user may use, transactions that allow users to buy and/or sell items via the service, interactions with advertisements that a user may perform, and/or other suitable items and/or objects. A user may interact with anything that is capable of being represented in social-networking system 1060 and/or by an external system of third-party system 1070, which is separate from social-networking system 1060 and coupled to social-networking system 1060 via a network 1010.

In one or more embodiments, social-networking system 1060 may be capable of linking a variety of entities. As an example and not by way of limitation, social-networking system 1060 may enable users to interact with each other as well as receive content from third-party systems 1070 and/or other entities, and/or to allow users to interact with these entities through an API and/or other communication channels.

In one or more embodiments, a third-party system 1070 may include one or more types of servers, one or more data stores, one or more interfaces, including but not limited to APIs, one or more web services, one or more content sources, one or more networks, and/or any other suitable components, e.g., that servers may communicate with. A third-party system 1070 may be operated by a different entity from an entity operating social-networking system 1060. In one or more embodiments, however, social-networking system 1060 and third-party systems 1070 may operate in conjunction with each other to provide social-networking services to users of social-networking system 1060 and/or third-party systems 1070. In this sense, social-networking system 1060 may provide a platform, and/or backbone, which other systems, such as third-party systems 1070, may use to provide social-networking services and functionality to users across the Internet.

In one or more embodiments, a third-party system 1070 may include a third-party content object provider. A third-party content object provider may include one or more sources of content objects, which may be communicated to a client system 1030. As an example and not by way of limitation, content objects may include information regarding things and/or activities of interest to the user, such as, for example, movie show times, movie reviews, restaurant reviews, restaurant menus, product information and reviews, and/or other suitable information. As another example and not by way of limitation, content objects may include incentive content objects, such as coupons, discount tickets, gift certificates, and/or other suitable incentive objects.

In one or more embodiments, social-networking system 1060 also includes user-generated content objects, which may enhance a user's interactions with social-networking system 1060. User-generated content may include anything a user can add, upload, send, and/or "post" to social-networking system 1060. As an example and not by way of limitation, a user communicates posts to social-networking system 1060 from a client system 1030. Posts may include data such as status updates and/or other textual data, location information, photos, videos, links, music and/or other similar data and/or media. Content may also be added to social-networking system 1060 by a third-party through a "communication channel," such as a newsfeed and/or stream.

In one or more embodiments, social-networking system 1060 may include a variety of servers, sub-systems, programs, modules, logs, and data stores. In one or more embodiments, social-networking system 1060 may include one or more of a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, and location store, among others. Social-networking system 1060 may also include suitable components such as network interfaces, security mechanisms, load balancers, failover servers, management-and-network-operations consoles, other suitable components, or any suitable combination thereof. In one or more embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar and/or common work experience, group memberships, hobbies, educational history, and/or are in any way related and/or share common attributes. The connection information may also include user-defined connections between different users and content (both internal and external). A web server may be used for linking social-networking system 1060 to one or more client systems 1030 and/or one or more third-party system 1070 via network 1010. The web server may include a mail server and/or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on and/or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, and/or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to and/or opt out of having their actions logged by social-networking system 1060 and/or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, and/or other suitable information to provide relevant advertisements, in the form of notifications, to a user.

Herein, a computer-readable non-transitory storage medium and/or media may include one or more semiconductor-based and/or other integrated circuits (ICs) (such, as for example, field-programmable gate arrays (FPGAs) and/or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards and/or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described and/or illustrated herein that a person having ordinary skill in the art would comprehend. The scope of this disclosure is not limited to the example embodiments described and/or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described and/or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
    a processor; and
    a memory coupled to the processor and that stores first instructions executable by the processor;
    wherein as the processor executes the first instructions, the system:
        identifies a video region of a plurality of video regions, each of the plurality of video regions within a video signal corresponding to a respective data binding of a plurality of data bindings;
        provides video information associated with the video region of the video signal to second program instructions, different from the first instructions, that utilize an application programming interface and provide a video effect;
        executes the second program instructions based on the video information associated with the video region of the video signal;
        receives a first output, from the second program instructions, that includes the video effect;
        produces an output video signal that includes the first output that includes the video effect;
        determines if the video region of the video signal changes;
        if the video region of the video signal changes:
            determines, by utilizing a computer vision process, a distance measurement change associated with the corresponding data binding, wherein the corresponding data binding is associated with a position of a face of a person;
            executes the second program instructions based on a change of the video information associated with the video region of the video signal that includes the distance measurement change, wherein the second program instructions increase a size of the video effect when the distance measurement change increases or decrease the size of the video effect when the distance measurement change decreases;
            receives a second output from the second program instructions that includes the video effect adjusted in accordance with the distance measurement change; and
            produces the output video signal that includes the second output that includes the video effect adjusted in accordance with the distance measurement change, wherein the size of the video effect increases when the distance measurement change increases or decreases when the distance measurement change decreases; and
        if the video region of the video signal does not change, continues producing the output video signal that includes the first output that includes the video effect.

2. The system of claim 1, wherein when the system produces the output video signal that includes the first output, the system combines the first output with at least one other output.

3. The system of claim 1,
    wherein when the system determines if the video region of the video signal changes, the system determines if a position associated with the corresponding data binding changes; and
    wherein if the video region of the video signal changes:
        when the system receives the second output from the second program instructions that includes the video effect, the system receives the second output from the second program instructions that includes the video effect adjusted in accordance with a change of the position; and
        when the system produces the output video signal that includes the second output that includes the video effect, the system produces the output video signal that includes the second output that includes the video effect adjusted in accordance with the change of the position.

4. The system of claim 1,
    wherein the plurality of data bindings includes at least one of a point on a body, a time, a path, and a gyroscope; and wherein the video region of the video signal corresponds to the at least one of the point on the body, the time, the path, and the gyroscope.

5. The system of claim 1, wherein the video region of the video signal includes at least one of a color attribute, an intensity attribute, and a transparency attribute.

6. The system of claim 1, wherein the system further: receives source code; and
compiles the source code into the second program instructions that are executable by the processor.

7. A method, comprising:
providing a video region of a plurality of video regions of a video signal, each of the plurality of video regions of the video signal corresponding to a respective data binding of a plurality of data bindings, to program instructions that utilize an application programming interface and provide a video effect;
executing the program instructions based on the video region of the video signal;
receiving a first output, from the program instructions, that includes the video effect;
producing an output video signal that includes the first output that includes the video effect;
determining if the video region of the video signal changes;
if the video region of the video signal changes:
determining, by utilizing a computer vision process, a distance measurement change associated with the corresponding data binding, wherein the corresponding data binding is associated with a position of a face of a person;
executing the program instructions based on a change of the video region of the video signal that includes the distance measurement change, wherein the program instructions increase a size of the video effect when the distance measurement change increases or decrease the size of the video effect when the distance measurement change decreases;
receiving a second output from the program instructions that includes the video effect adjusted in accordance with the measurement change; and
producing the output video signal that includes the second output that includes the video effect adjusted in accordance with the distance measurement change, wherein the size of the video effect increases when the distance measurement change increases or decreases when the distance measurement change decreases; and
if the video region of the video signal does not change, continuing to perform the producing the output video signal that includes the first output that includes the video effect.

8. The method of claim 7, wherein the producing the output video signal that includes the first output includes combining the first output with at least one other output.

9. The method of claim 7,
wherein the determining if the video region of the video signal changes includes determining if a position associated with the corresponding data binding changes; and
wherein if the video region of the video signal changes:
the receiving the second output from the program instructions that includes the video effect includes receiving the second output from the program instructions that includes the video effect adjusted in accordance with a change of the position; and
the producing the output video signal that includes the second output that includes the video effect includes producing the output video signal that includes the second output that includes the video effect adjusted in accordance with the change of the position.

10. The method of claim 7,
wherein the plurality of data bindings includes at least one of a point on a body, a time, a path, and a gyroscope; and
wherein the video region of the video signal corresponds to the at least one of the point on the body, the time, the path, and the gyroscope.

11. The method of claim 7, wherein the video region of the video signal includes at least one of a color attribute, an intensity attribute, and a transparency attribute.

12. The method of claim 7, further comprising:
receiving source code; and
compiling the source code into the program instructions into processor instructions that are executable by a processor.

13. A non-transitory computer-readable storage that includes instructions executable by a processor of a system, wherein as the processor executes the instructions, the system:
provides a video region of a plurality of video regions of a video signal, each of the plurality of video regions of the video signal corresponding to a respective data binding of a plurality of data bindings, to program instructions that utilize an application programming interface and provide a video effect;
executes the program instructions based on the video region of the video signal;
receives a first output, from the program instructions, that includes the video effect;
produces an output video signal that includes the first output that includes the video effect;
determines if the video region of the video signal changes;
if the video region of the video signal changes:
determines, by utilizing a computer vision process, a distance measurement change associated with the corresponding data binding, wherein the corresponding data binding is associated with a position of a face of a person;
executes the program instructions based on the video region of the video signal and a change of the video region of the video signal that includes the distance measurement change, wherein the program instructions increase a size of the video effect when the distance measurement change increases or decrease the size of the video effect when the distance measurement change decreases;
receives a second output from the program instructions that includes the video effect adjusted in accordance with the distance measurement change; and
produces the output video signal that includes the second output that includes the video effect adjusted in accordance with the measurement change, wherein the size of the video effect increases when the distance measurement change increases or decreases when the distance measurement change decreases; and
if the video region of the video signal does not change, continues in producing the output video signal that includes the first output that includes the video effect.

14. The non-transitory computer-readable storage of claim 13, wherein when the system produces the output video signal that includes the first output, the system combines the first output with at least one other output.

15. The non-transitory computer-readable storage of claim 13,
   wherein when the system determines if the video region of the video signal changes, the system determines if a position associated with the corresponding data binding changes; and
   wherein if the video region of the video signal changes:
      when the system receives the second output from the program instructions that includes the video effect, the system receives the second output from the program instructions that includes the video effect adjusted in accordance with a change of the position; and
      when the system produces the output video signal that includes the second output that includes the video effect, the system produces the output video signal that includes the second output that includes the video effect adjusted in accordance with the change of the position.

16. The non-transitory computer-readable storage of claim 13, wherein the video signal includes at least one of a color attribute, an intensity attribute, and a transparency attribute.

17. The non-transitory computer-readable storage of claim 13, wherein the system further:
   receives source code; and
   compiles the source code into the program instructions that are executable by the processor.

* * * * *